United States Patent [19]

Czerner et al.

[11] 4,089,109
[45] May 16, 1978

[54] CUTTER HEAD ASSEMBLY

[75] Inventors: Peter Alfred Czerner, Trumbull; Michael John Marchetti, Bridgeport, both of Conn.

[73] Assignee: Sperry Rand Corporation, Bridgeport, Conn.

[21] Appl. No.: 759,936

[22] Filed: Jan. 17, 1977

[51] Int. Cl.² ............................................. B26B 19/06
[52] U.S. Cl. ..................................... 30/34.1; 30/43.92
[58] Field of Search .................. 30/34.1, 43.91, 43.92, 30/346.51

[56] References Cited
U.S. PATENT DOCUMENTS

| | | | |
|---|---|---|---|
| 2,243,196 | 5/1941 | Dalkowitz | 30/43.92 |
| 3,386,167 | 6/1968 | Schuessler | 30/43.92 X |
| 3,561,118 | 2/1971 | Antretter | 30/43.91 X |

FOREIGN PATENT DOCUMENTS 1,018,411  1/1953  France ...................... 30/43

*Primary Examiner*—Robert C. Watson
*Attorney, Agent, or Firm*—Charles R. Miranda; Joseph S. Failla

[57] ABSTRACT

A cutter head assembly for a foil type electric dry shaver wherein the outer cutter foil is provided with a plurality of bowed arcuate outer cutting surfaces and wherein the inner cutter assembly comprises a balanced arrangement of individual blade members each having a plurality of arcuate cutting edges for engagement with the undersurface of the bowed arcuate outer cutting foil.

8 Claims, 5 Drawing Figures

U.S. Patent  May 16, 1978  4,089,109
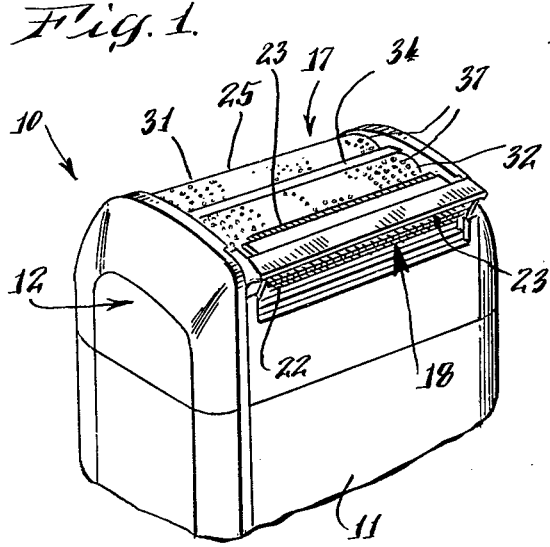
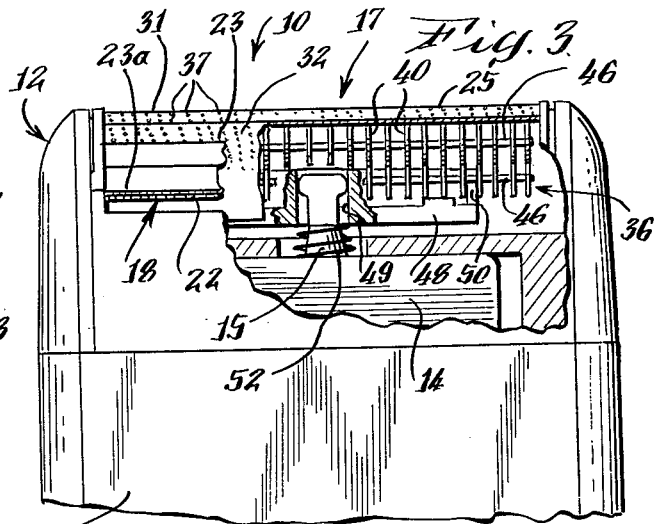
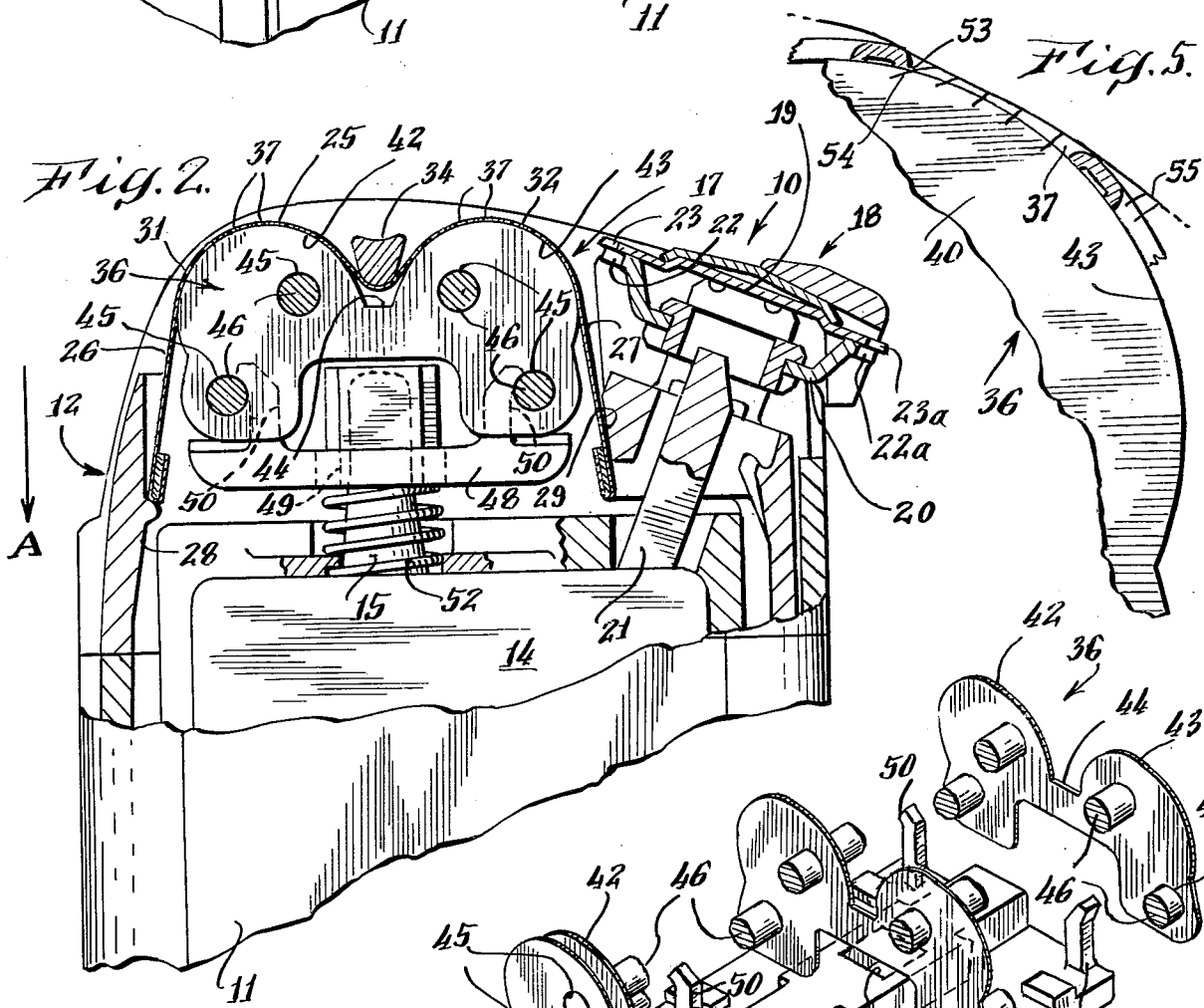

CUTTER HEAD ASSEMBLY

BACKGROUND OF THE INVENTION

The present invention is directed to new and useful improvements in electric dry shavers and in particular to a cutter head assembly for a foil type electric dry shaver.

Electric dry shavers of the type generally referred to as foil type electric dry shavers are well-known. The latter type electric dry shaver differs from other shavers which utilize stationary outer cutters and movable inner cutters in that the outer cutter element is comprised of a resilient, flexible metallic foil member. The inner cutter for these shavers usually includes arcuate shaped blades in shearing contact with the undersurface of the outer cutter foil member. The foil member is provided with a plurality of hair reception slots through which hair bristles are fed during the act of shaving for shearing by the movable inner cutter. The foil member is of generally rectangular configuration prior to mounting on the shaver casing and is made of nickel and formed by an electroforming process. Spaced marginal portions of the foil are usually secured to the walls or other portions of the shaver casing and when the foil is mounted on the casing the intermediate portion is bowed about the arcuate inner cutter blades conforming the foil to the configuration thereof.

The arcuate shaped inner cutter is mounted on a support member and urged into shearing engagement with the undersurface of the foil by spring means mounted within the casing. It has been found that the arcuate shape of the foil and mating configuration of the inner cutter blades allows for a more efficient presentation of the hair reception slots in the foil to receive hair bristles. In some foil type shavers therefore the foil is shaped into two or more parallel arcuate rows providing a multiple bowed or curved outer cutter head surface. To accommodate these multiple outer cutting rows the inner cutter is provided with a like number of rows of spaced arcuate shaped blades mounted on a support member and placed into cutting cooperation with the foil for reciprocating movement relative to the undersurface of the foil.

In use, these multiple bowed cutting surfaces have proven quite desirable in providing more usable shaving area and a multiple combing and cutting action. Various problems however, are encountered in the manufacture and use thereof. In some instances, proper balancing of the driven mass of the inner cutter is hampered by the undesired spacing between the rows of inner cutter blades which causes the assembly either to move laterally in reciprocation in the longitudinal direction of the outer cutter foil, or to vibrate in use. In other instances, the relatively large inner cutter structure results in undesired spacing between the arcuate undersurfaces of the foil and the inner cutter resulting in a lack of contact between the inner cutter blades and the foil and a resulting loss of cutting action. The undesirable size of the inner cutter assembly also increases the area of operation thereof within the shaver and presents problems in providing an effective drive connection with the cutter drive means. In addition the greater the radius of the arcuate inner cutter blade the more difficult the problems are in assuring proper contact between the edges thereof and the undersurface of the outer cutter foil in a multiple bowed cutter head assembly.

Further, while the foil shavers are satisfactory for close shaving of short hair bristles, long hairs tend to bend over and lie close against the skin instead of entering the openings in the foil. If the foil member is formed with openings large enough to comb and accept long hairs the skin of the user will tend to enter the cutter assembly and come in contact with the moving cutter blades causing irritation. To overcome the foregoing difficulty some foil type shavers are provided with a trimmer unit having comb-like cutting teeth mounted adjacent the outer cutter foil to cut long hairs in advance thereof and to feed the shortend bristles thereof to the small apertures of the foil member. Such a trimmer unit is disclosed in a co-pending patent application Ser. No. 648,056 filed Jan. 12, 1976.

In foil shavers having the aforementioned multiple outer cutter rows it has been found desirable to have the cutter mass located between the rows of arcuate cutter blades for connection of the inner cutter support member with the motor drive arm. In prior art cutter assemblies, the lateral spacing between the arcuate rows of inner cutter blades results in balancing problems and ensuing vibrations in operation of the inner cutter. In response to these aforementioned problems the overall size of the cutter assembly has been increased in prior art shavers resulting in enlarged areas of operation within the limited spacial confines of the relatively small shaver casing. As a result difficulties have been encountered in providing a foil type shaver having a multiple bowed foil outer cutter either alone or in combination with the desirable trimmer and long hair cutter unit.

In addition to the mentioned pending patent application other prior art patents which disclose electric shavers which are typical of those discussed are U.S. Pat. Nos. 3,376,642; 3,561,118; 3,634,936; 3,742,072 and 3,874,079 and German Pat. Nos. 932,172 and 1,022,121.

It is an object of the present invention to provide a novel cutter head assembly and shaving system for an electric dry shaver.

Another object is to provide a novel cutter head assembly for a foil type shaver having multiple arcuate or bowed shaped outer cutter surfaces wherein the inner cutter assembly is maintained in close shearing contact with the undersurface of the foil.

A further object is to provide a novel compact cutter head assembly providing increased cutting efficiency within the limited spatial confines of an electric dry shaver casing.

Another object is to provide a novel inner cutter assembly for a foil type electric dry shaver having novel means for balancing the inner cutter assembly in operation.

A still further object is to provide a novel balanced inner cutter assembly for a foil type shaver having a more efficient cutting action and means for feeding hair bristles for the cutting system.

SUMMARY OF THE INVENTION

The present invention contemplates a novel cutter head assembly and shaving system for an electric dry shaver. In one embodiment the cutter head comprises a resilient foil type outer cutter foil wherein means are provided to form the foil into at least two parallel arcuate shaped outer cutting surfaces. An inner cutter assembly is provided having a row of cutter blades with each blade provided with dual cutting surfaces to engage the parallel undersurfaces of the foil outer cutter.

Each inner cutter blade is formed in a H-shape from a single piece of metal having an interconnecting intermediate portion. The blades are interconnected by a plurality of longitudinally extending bar members. A single support member is provided to mount the inner cutter assembly on the shaver drive means within the center of the inner cutter mass. The foil is thereby maintained in close shearing relationship with the cutting surface of the inner cutter and in close adjacency to the leading cutting edge of a long hair trimmer unit.

The above and other objects of the present invention will appear more fully hereinafter from a consideration of the detailed description which follows taken together with the accompanying drawing wherein one embodiment is illustrated.

DESCRIPTION OF THE DRAWING

In the drawing:

FIG. 1 is a fragmentary perspective view of an electric dry shaver embodying the present invention;

FIG. 2 is an enlarged side elevational view of the upper portion of the electric dry shaver of FIG. 1 with parts broken away to show the interior thereof;

FIG. 3 is a fragmentary front elevational view of the electric dry shaver of FIG. 1 with portions of the casing broken away to show the interior of the cutter head assembly;

FIG. 4 is a fragmentary perspective view of portions of the inner cutter assembly; and FIG. 5 is an enlarged fragmentary view of portions of the inner cutter blade in contact with a portion of the outer cutter foil.

DETAILED DESCRIPTION

Referring now to the drawing for a more detailed description of the present invention, an electric shaver is generally indicated by the reference numeral 10 in FIGS. 1 to 3. Shaver 10 includes a casing made of a hard molded plastic material and comprises a main body 11 and a hair pocket 12 which is detachably mounted on body 11 in any well-known manner. Shaver 10 includes a motor 14 (partly shown in FIG. 2) arranged in body 11 and from which motor 14 extends a drive arm 15 for operating a main cutter head assembly 17 in a usual manner.

An auxiliary trimmer unit 18 is provided in shaver 10 adjacent cutter head assembly 17 having a stationary outer cutter comb 19 and a movable inner cutter 20. Inner cutter 20 is adapted for reciprocation by motor drive arm 21 and is provided with a pair of spaced toothed cutting edges 22-22a in cutting association with spaced cutting edges 23-23a of outer cutter comb 19. Edges 22-23 of trimmer unit 18 are adapted to shear long hair and for feeding the clipped bristles to cutter head 17 while edges 22a and 23a are utilized for trimming and cutting mustaches or sideburns in a known manner.

The outer cutter for the main cutter head assembly 17 comprises a flexible foil 25 having spaced marginal portions 26 and 27 (FIG. 2) secured to wall portions 28 and 29 of hair pocket 12 in any well-known manner. Foil 25 is preferably made of nickel by a suitable electroforming process and prior to mounting on hairpocket 12 is of a generally rectangular configuration. In mounted position on hairpocket 12, foil 25 is shaped to include parallel arcuate shaped cutting surfaces 31 and 32. Cutting surfaces 31 and 32 are maintained in arcuate shape by a bar 34 which extends longitudinally across hair pocket 12 and by the engagement of an inner cutter assembly 36 with the undersurface of the foil in a manner to be hereinafter explained in further detail. Hair reception apertures 37 are provided in foil 25 and are adapted to receive hair bristles for shearing by the inner cutter 36 upon reciprocation thereof by drive arm 15 of motor 14.

It is a feature of the present invention to provide a novel inner cutter assembly 36 for more efficient operation of cutter heat 17. To this end, inner cutter 36 comprises a plurality of individual spaced H-shaped metal blades 40. Each blade 40 has a pair of arcuate shaped cutting surfaces 42 and 43 interconnected by an intermediate portion 44. Blades 40 are formed from a stamping process and are provided with a plurality of openings 45 through which extend rods 46. The opposite ends of rods 46 are peemed and maintain blades 40 in assembled relationship whereby cutting surfaces 42-43 are arranged in aligned rows. A driven support is provided for inner cutter 36 (FIGS. 2 and 4) and includes a rectangular support plate 48 of premolded plastic material. An intermediate portion of plate 48 is provided with a central opening 49 for engaging drive arm 15 of motor 14. The walls of opening 49 (FIG. 2) are arranged at the center of the inner cutter assembly 36 adjacent cutting surfaces 42-43 beneath intermediate portions 44, whereby drive arm 15 is located well within the inner cutter assembly at the center of the mass thereof. Upright resilient detents 50 are formed at each corner of support 48 and are snap-fitted into detenting relationship with adjacent rods 46 of inner cutter 36 to secure support 48 thereto.

In the foregoing manner, the center of mass of inner cutter assembly 36 is accurately and evenly distributed about drive arm 15 with drive arm 15 arranged within the center of the driven mass. The fact that blades 40 are of a one-piece construction results in the close engagement of the bowed surfaces 31-32 of foil 25 with the aligned rows of cutting surfaces 42-43 of inner cutter blades 40. In addition the compactness of inner cutter assembly 36 increases the rigidity of the bowed foil 40 in operation of cutter head 17 increasing the efficiency thereof.

In operation of shaver 10 hair bristles will enter apertures 37 and will be sheared by blade 40 against the undersurface of foil 25 about the circumference of aperture 37. It has been found that in accordance with the described structure that the close engagement of foil surfaces 31-32 with blade cutting surfaces 42-43 increases the angle of approach of edge portion 53 (FIG. 5) of aperture 37 to enhance pick-up of longer hair bristles 54, which tend to lie against the surface 55 of the skin. It has been found that as a result of the compact construction of inner cutter assembly 36 and the location of motor drive arm 15 within the center of the inner cutter mass that a tighter or closer embracing of foil 25 to the arcuate surface of blades 40 results, increasing the area for shearing hair bristles entering cutter head assembly 17.

As cutter head 17 is pressed against the skin of the user, foil 25 will flex and inner cutter 36 will move downwardly in the direction designated by the arrow A in FIG. 2 against the resiliency of spring 52. At the same time, long facial hairs will be combed and clipped by adjacent cutter blades 22-23 of trimmer 18 with the bristles fed directly into the cutter head assembly 17. As a result of the compact structure of the cutter head assembly 17 the trimmer assembly 18 is enabled to be positioned closer to the bowed surface 32 of cutter head 17. In this manner an efficient shaver head arrangement is provided for shearing both long and short facial hairs in one continuous operation.

It will also be apparent from the foregoing description that there are other advantages in the novel inner cutter assembly 36. The single blade construction allows for a more accurate alignment of the rows of cutting surfaces 42–43 resulting in a truer alignment with the undersurface of foil surfaces 31–32. A further advantage is that a compact cutter assembly is provided which allows for a multi-cutter unit requiring a smaller area of operation in the shaver and also allow for ease of manufacture and reduction of the number of parts required. A still further advantage is that the compact assembly of cutter blades 40 allows for proper disposition of the cutter drive arm 15 within the center of cutter mass substantially eliminating unnecessary spacing of the inner cutter rows and allowing for efficient balancing of the cutter mass in operation of the shaver greatly reducing vibrations and assuring more positive contact between the cutting surfaces.

Although one embodiment of the present invention has been illustrated and described in detail, it is to be expressly understood that the invention is not limited thereto. Various changes can be made in the design and arrangement of parts without departing from the spirit and scope of the invention as the same will now be understood by those skilled in the art.

We claim:

1. A cutter assembly for an electric shaver comprising;
    a. a flexible foil outer cutter formed into parallel rows of arcuate-shaped outer cutters,
    b. an inner cutter assembly providing parallel rows of arcuate-shaped cutting surfaces,
    c. means for supporting said rows of cutting surfaces in engagement with said rows of outer cutters,
    d. said inner cutter assembly including a plurality of individual H-shaped cutter blades comprising a one-piece construction having an intermediate segment spacing opposed blade segments,
    e. said blade segments including a cutter portion formed with said arcuate-shaped cutting surfaces on the periphery thereof and a support portion having means formed therein for joining said plurality of individual cutter blades in said rows of parallel arcuate-shaped cutting surfaces, and
    f. means positioned between said blade segments adjacent said intermediate segment for operating said inner cutter assembly in hair shearing relationship with said foil outer cutter.

2. The cutter assembly of claim 1 wherein said cutting surfaces on the periphery of the cutter portions extend from the apex of said cutter portions in a circular arc a distance of approximately ninety degrees, said circular arc having a center of radius located within each of said cutter portions on an imaginary line which extends laterally of said cutter blade and across said intermediate segment.

3. The cutter assembly of claim 1 wherein said intermediate segment includes a first surface portion recessed with respect to the apex of said cutting surfaces for providing operating clearance of the inner cutter assembly between said rows of outer cutters.

4. The cutter assembly of claim 3 wherein said intermediate segment includes a second surface portion recessed with respect to said support portion of said segment to accommodate said operating means well within the center of mass of said inner cutter assembly.

5. The cutter assembly of claim 4 wherein said supporting means include a plate for supporting said cutter blades, said support plate having walls of a central opening formed therein extending into the recess formed by said second surface portion of the intermediate segment, and said operating means include a drive arm having an upper end thereof engaging said walls adjacent said second surface portion of the intermediate segment.

6. The cutter assembly of claim 5 wherein said joining means include openings provided in said support portion of the blade segments and said joining means include rods extending through said openings for maintaining said cutter blades in assembled relationship.

7. The cutter assembly of claim 6 wherein said support plate is provided with upright resilient members engaging said rods for securing the assembled cutter blades to said support plate.

8. The cutter assembly of claim 7 wherein an opening is provided in said cutter portion of the blade segment adjacent the apex of said arcuate-shaped cutting surfaces and rods for aligning said cutting surfaces in said rows extend through said openings in said cutter portions.

* * * * *